May 19, 1925.                                                                1,538,204
R. MUELLER
APPARATUS FOR CARBONATING LIQUIDS
Filed July 26, 1920                          5 Sheets-Sheet 2

Witnesses:
W. F. Kilroy
Harry R. L. White

Inventor:
Rudolph Mueller
By Murray Lot & Wilson
Attys.

May 19, 1925.

R. MUELLER

APPARATUS FOR CARBONATING LIQUIDS

Filed July 26, 1920 5 Sheets-Sheet 3

Witnesses:
W. F. Kilroy
Harry G. White

Inventor:
Rudolph Mueller
By Murray, Lotz & Wilson
Attys.

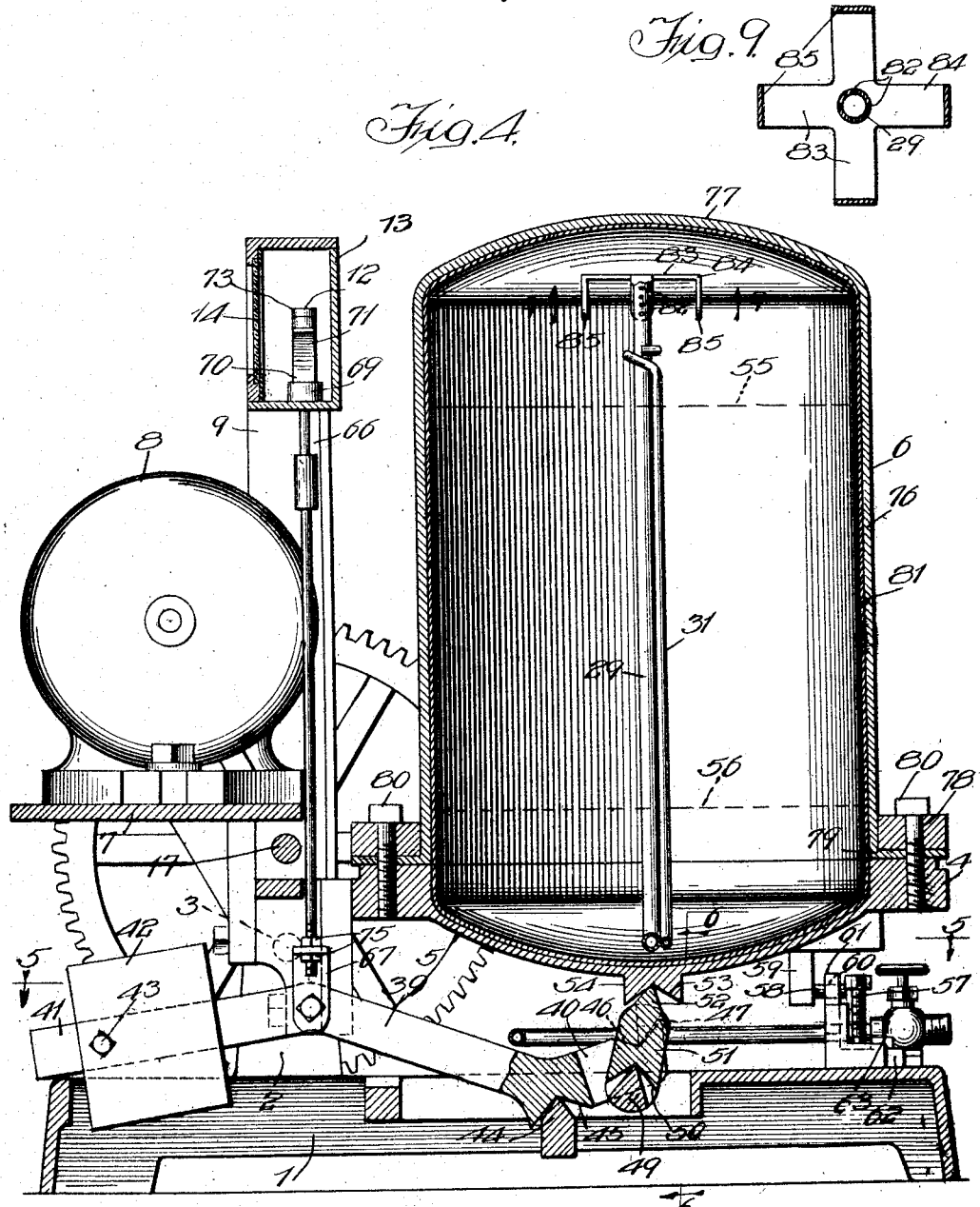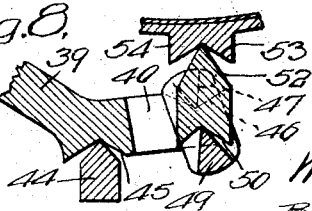

May 19, 1925.  
R. MUELLER  
APPARATUS FOR CARBONATING LIQUIDS  
Filed July 26, 1920  5 Sheets-Sheet 5

1,538,204

Witnesses:  
W. F. Kilroy  
Harry R. L. White

Inventor:  
Rudolph Mueller  
By Murray Lotz & Wilson  
Attys.

Patented May 19, 1925.

1,538,204

UNITED STATES PATENT OFFICE.

RUDOLPH MUELLER, OF CHICAGO, ILLINOIS.

APPARATUS FOR CARBONATING LIQUIDS.

Application filed July 26, 1920. Serial No. 399,093.

*To all whom it may concern:*

Be it known that I, RUDOLPH MUELLER, a citizen of the United States, and a resident of Chicago, in the county of Cook and State of Illinois, have invented certain new and useful Improvements in Apparatus for Carbonating Liquids, of which the following is a specification.

My invention relates to improvements in carbonating machines of the kind commonly used at soda water fountains for automatically maintaining a constant supply of fresh carbonated water.

The object of my invention is to provide a simple automatic machine for maintaining a constant supply of water impregnated with carbon dioxide gas.

The improvement includes an overbalancing device of novel character which operates when the supply of water runs low to move the point of support in such a direction that the final overbalancing movement is accomplished suddenly and by which movement the motor switch is closed and the gas valve is opened, and which operates in like manner when the container is nearly filled to quickly stop the pump and shut the gas valve. The pump is run by an electric motor and the improvement includes an electric switch of simple character combined with the quick operation mentioned which effectually prevents the burning of the switch in closing and opening same.

Other features of my invention relate to various details of construction, operation and control which will be more clearly understood from the following description, taken in conjunction with the accompanying drawings forming part of this specification and in which:—

Figure 4 is a vertical central longitudinal section of the machine substantially on the line 4—4 of Figure 3;

Figure 8 is a fragmentary sectional view of the operating levers similar to Figure 4 and showing the receptacle at the lower limit of its movement;

Figure 9 is a detail horizontal section on the line 9—9 of Figure 4;

Figure 13 is a fragmentary horizontal section on the line 13—13 of Figure 1.

Figure 1:
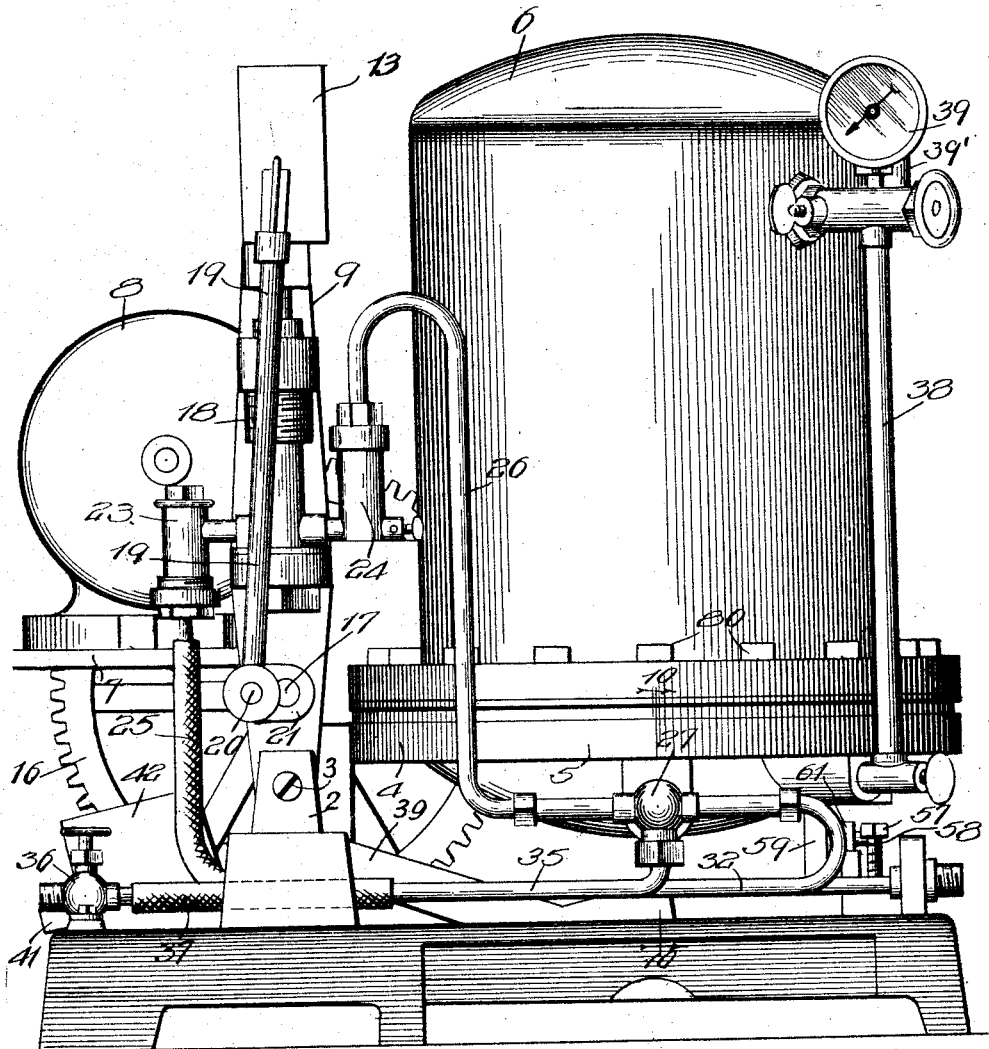
Figure 1 is a side elevation of a machine embodying my invention.
Figure 2:
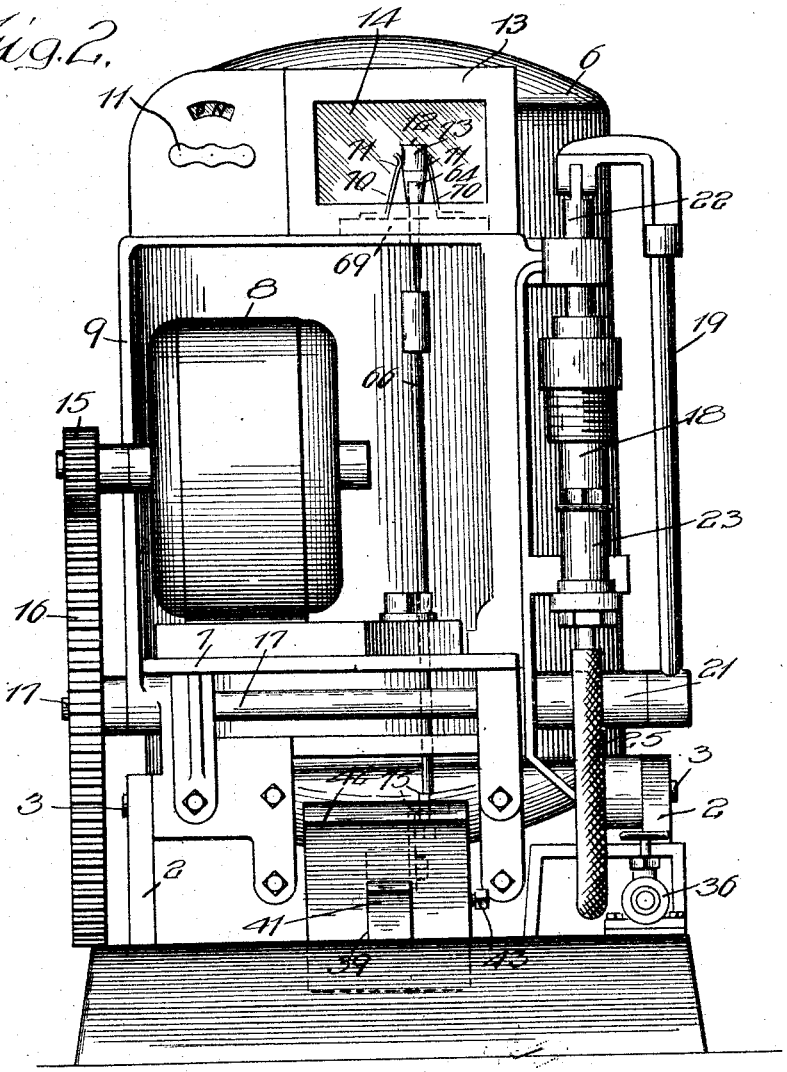
Figure 2 is an elevational view looking at the motor end of the machine.

In said drawings, 1 is a base plate upon which the several parts of the machine are mounted so that the machine as a whole is a unit.

Adjacent to one end of the base rigid standards 2 rise upon which on pivots 3 is pivotally mounted an auxiliary or sub-base 4. This member 4 extends towards the opposite end of the machine in the form of a lower head or base 5 of a vertical cylindrical receptacle 6.

The cylinder 6 constitutes the carbonating chamber. It is adapted to be connected to a source of supply of carbon dioxide under pressure and I provide means for pumping water into the receptacle under the pressure of the gas, viz substantially 80 to 90 lbs. per square inch.

At the end of the auxiliary base opposite to the head 5 I arrange a suitable bracket 7 for carrying an electric motor 8 for operating the pump. Rising above the bracket 7 and connected with the auxiliary base is a framework 9 upon the upper end of which I mount a manual electric cut-off switch 11 and an automatic electric control switch 12. I preferably enclose the switch 12 in a metal box 13 provided with a clear glass front 14 to protect the switch and to permit its operation to be seen.

The motor shaft carries a pinion 15 which meshes with a large wheel 16 mounted on one end of a horizontal shaft 17 which is mounted in suitable bearings provided in the auxiliary base. At the side of the machine opposite to the gear wheel 16 I provide a reciprocating water pump 18, and this pump is operated by a connecting rod 19 the lower end of which is mounted on a crank pin 20 carried by a crank 21 mounted on the shaft 17. The connecting rod 19 rises to the upper end of pump 18 and is pivotally connected to the upper end of the pump piston rod 22. The pump 18 is mounted on said auxiliary base 4. All of the parts or devices carried by the auxiliary base are substantially rigid with it in that they move with the auxiliary base.

At the lower end of the pump I provide an inlet connection 23 and an outlet connection 24. These connections are provided with suitable check valves. The inlet is connected to a suitable source of supply of fresh water through a flexible pipe connection 25. The outlet or delivery connection 24 is connected by a rigid pipe 26 to an angle connection member 27 which is rigid with the head 5. This member 27 has a passage 28 which is connected with the lower end of a pipe 29 which rises centrally within the receptacle 6 to the upper end thereof for delivering the water into the receptacle.

The connection 27 is provided with a second passage 30 which connects within the receptacle to a smaller pipe 31 which also rises to the upper part of the receptacle for the delivery of the carbon dioxide. This second pipe is secured to and is supported by the larger water pipe. The outer end of the passage 30 is connected by a block tin pipe 32 to a valve connection 33 at the opposite side of the base. This valve connection 33 is adapted to be connected to a supply of $CO_2$ under pressure such as the usual steel cylinder used for this purpose and which carries a suitable pressure reducing valve for reducing the pressure of the gas which is delivered to the receptacle at a pressure of 80 to 90 lbs. per square inch. The pipe 32 is made in the form of a large curve or loop to provide flexibility to allow for the movement of the connection 27, the valve connection 33 being fixed to the base.

The connection 27 has a third passage 34 which connects directly with the interior of the receptacle 6 for the delivery of the carbonated water from the receptacle and the outer end of this passage is connected by a pipe 35 to a delivery control valve 36 fixed to the base and adapted to be connected to a pipe to deliver the carbonated water to the soda water fountain or other place of use. To provide flexibility in this latter connection I insert a section 37 of flexible pipe or hose.

On one side of the receptacle I provide a suitable water gauge glass 38 surmounted by a pressure gauge 39.

The receptacle is partly counterbalanced by the motor and other parts which are mounted on the opposite end of the auxiliary base 4; that is at the opposite side of the pivots 3. For completing the counterbalancing of the receptacle and controlling the starting and stopping of the motor I provide a counterbalancing lever 39, one end 40 of which extends to a point substantially centrally below the receptacle 6 and the opposite end 41 extends out beneath the bracket 7. Upon the outer end 41 I provide a relatively large and heavy adjustable counterweight 42 which can be secured in its adjusted position on the lever by a set screw 43. This lever is mounted to rock in a vertical plane on a knife edge support 44 adjacent to its inner end 40 and the lever is provided with a V-notch to receive the knife edge support 44 and position the lever thereon. The inner end 40 of the lever is bifurcated and the arms thereof are provided with V-notches 46 in their upper edges to receive oppositely disposed V-shaped projections 47 in the side arms of the U-shaped link member 48 which hangs between the arms 45. The cross bar 49 at the lower end of the link 48 is V-shaped on its upper side and is received in a V-notch 50 in the lower end of a strut 51. The upper end 52 of the strut 51 is also V-shaped and is received in a V-notch 53 in a depending projection 54 arranged substantially centrally on the lower side of the head 5.

The outer end 41 of the lever 39 is quite long relatively to the inner end 40 and hence the counterweight 42, though not nearly so heavy as the receptacle 6 and its contents, is effective to counterbalance the receptacle even when nearly full of water. The bottom of the notches 46 in which the U-shaped link 48 hangs, is arranged at a higher level than the knife edge support 44 and consequently as the inner end of the lever moves downwardly during the filling operation, the radial line extending from the top of the support 44 through the bottom of the notches 46 is swung down toward the horizontal and the effective length of the short end of the lever is lengthened. This increases the leverage of the receptacle over the counterweight 42. On the other hand the bottom of the notch 53 in the projection 54 on the receptacle is about on the level with the pivotal support 3 of the auxiliary base 4 and consequently this point is carried horizontally towards the thin knife edge support 44 as the receptacle moves downwardly. I make use of this differential movement of these two points in combination with the swinging link 48 to effect a relatively sudden change of the leverage to cause the receptacle to complete the latter part of its downward movement rapidly.

The swinging lever 48 and the strut 51 tend to take stable positions in balanced relation at all times. In the upper position of the receptacle the center line of the strut is in an inclined direction in a general direction toward the knife edge support 44 as best shown in Figure 4, while in the lower position of the receptacle the inclination of this line is reversed, or away from the knife edge support. As the receptacle is being filled with water and getting heavier it gradually descends, and the swinging link gradually changes from its inclined position as shown in Figure 4 to a vertical position, at which time the resultant push of the weight of the receptacle with its load causes the swinging link to swing outwardly, thus suddenly increasing the effective length of the short end of the lever and causing the receptacle and the lever to move rapidly during the latter part of the movement. It will be understood that the receptacle is caused to move downwardly by the addition of the water pumped into it and reaches the lower limit of its movement at the time that the level of the water has been raised in the receptacle substantially to the upper water line 55. The overbalancing of the counterweighted lever described, causes the receptacle to remain down while the water is being withdrawn from the receptacle to lower the level of water therein substantially to the lower water line 56, thus causing the operation of the motor at intervals depending upon the rapidity with which the charged water is withdrawn from the receptacle.

As the receptacle, in its downward movement, on account of the addition of the water thereto, reaches a point where the U-shaped link hangs substantially vertically, the lower end of the link is then swung quickly outwardly so that as it reaches the lower limit of its movement it stands with its center line substantially at right angles to a radial line extending through the edge of the knife edge support 44 and the bottom of the V-notch 46 in the end 40 of the lever 39, thus resulting in the longest effective leverage on the counterbalanced lever. Consequently the receptacle remains at the lower limit of its movement until the water is sufficiently drawn off from the receptacle to lower the level substantially to the lower line 56.

To limit the movement of the leverage system and the receptacle the rear or long end 41 of the lever 39 is arranged to contact with the base 1 to limit the upper movement of the receptacle and I provide an adjustable stop 63 at the opposite end of the base upon which the receptacle rests at the lower limit of its movement. This adjustable stop consists of a vertical threaded screw 57 mounted in a suitable hole in the base.

As the receptacle is not tied to the leverage system and might fall away from same thus permitting the link 48 and the strut 49 to be displaced, I provide means for positively limiting the movement of the auxiliary base and receptacle on the pivots 3. This limiting means comprises a prong or projection 58 extending out horizontally from a depending projection 59 on the head 5 which enters a vertical limiting slot 60 in the vertical leg 61 of the L-shaped member 62 secured to the base by a bolt 63. This angle member is entered upon projection 58 and secured in position after the other parts are assembled.

Figure 7:
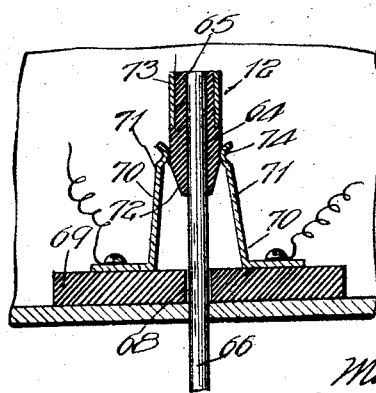
Figure 7 is a vertical central sectional view of the motor control switch.
Figure 12:
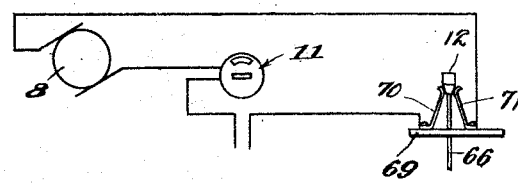
Figure 12 is a conventional showing of the electrical connections.
Figure 3:
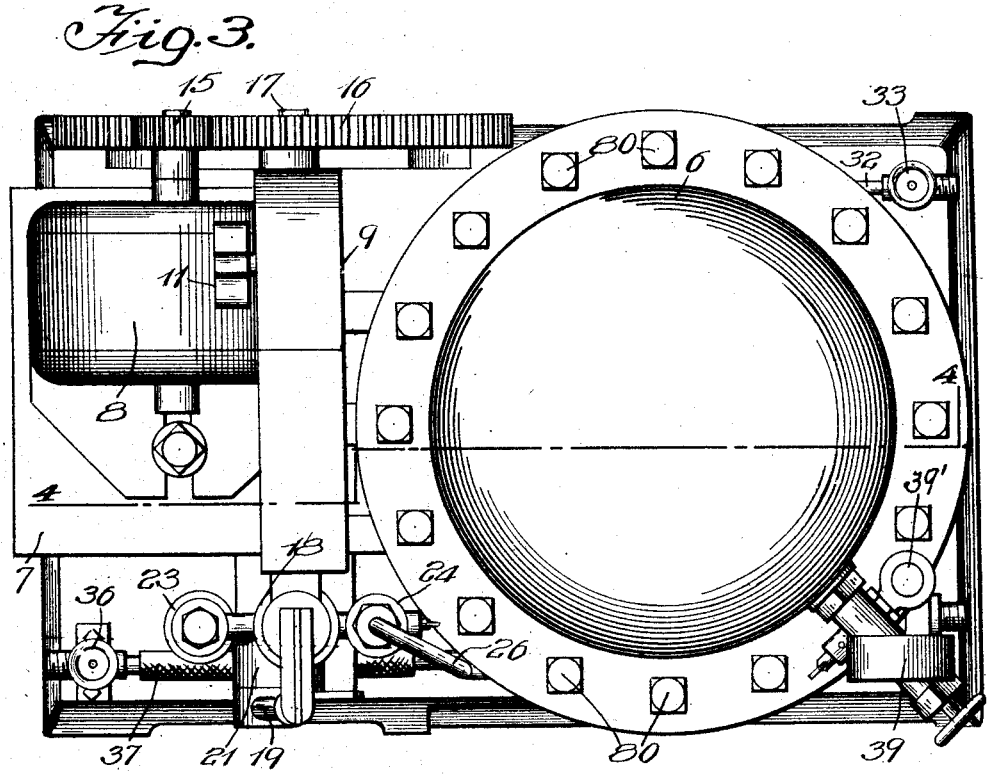
Figure 3 is a top plan view of the machine.
Figures 10, 11:
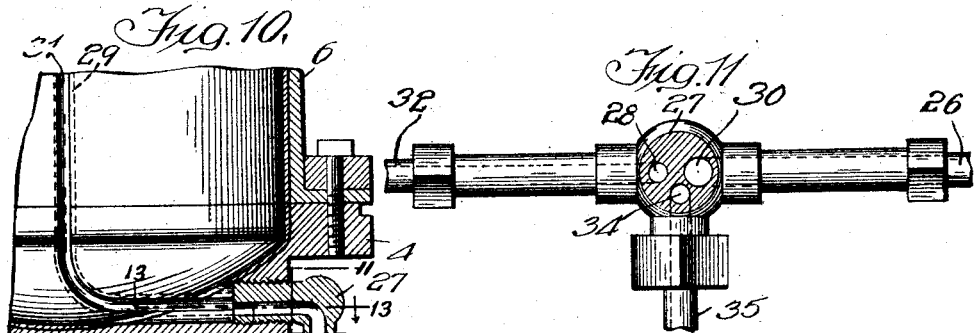
Figure 10 is a fragmentary detail section on the line 10—10 of Figure 1.
Figure 11 is a vertical detail section of the connection to the receptacle on the line 11—11 of Figure 10.
Figure 5:
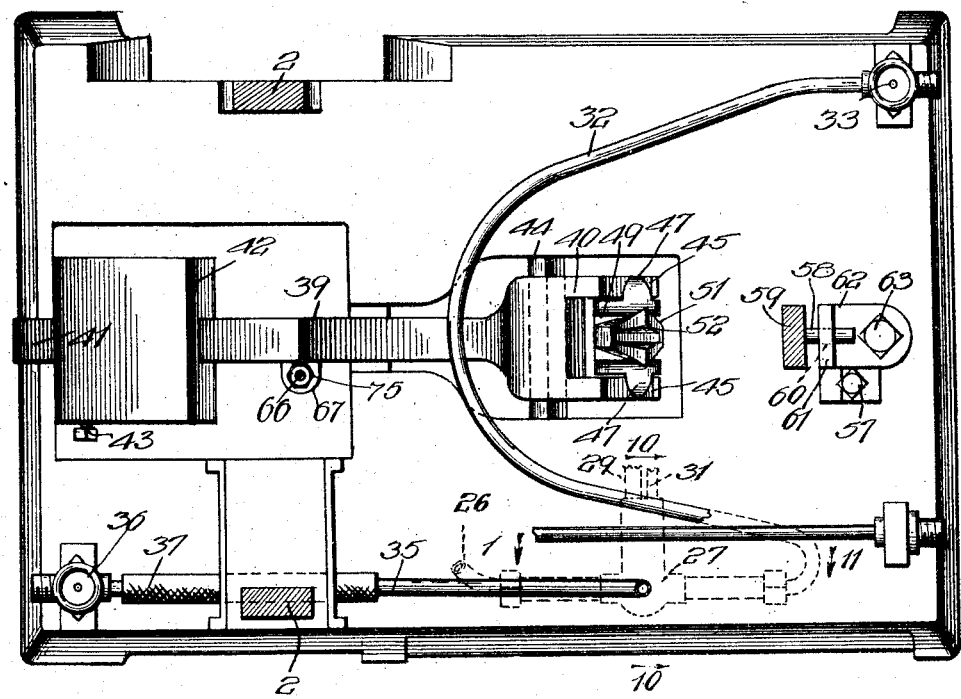
Figure 5 is a horizontal section substantially on the line 5—5 of Figure 4, showing a plan view of the counterbalanced lever.
Figure 6:
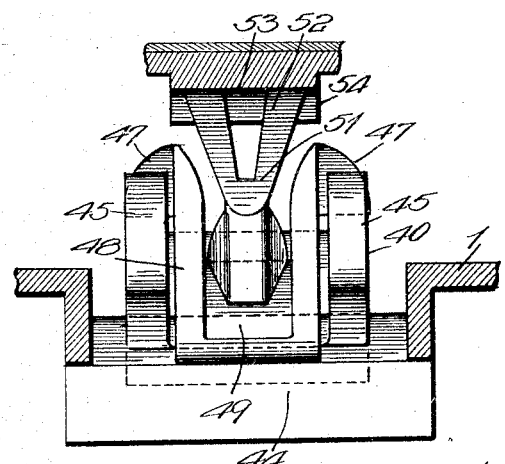
Figure 6 is an enlarged fragmentary vertical cross sectional view of the line 6—6 of Figure 4.

The electric switch 12, as best shown in Figure 7, consists of a rectangular block 64 of insulation material mounted upon the upper end 65 of a vertical rod 66. This rod extends down and is pivotally connected at its lower end to an angle bracket 67 secured to the counterbalancing lever 39 at a point between the support 44 and the weighted end of the lever.

The rod 66 passes through a guide opening 68 in an insulation block 69 secured on the bracket 9 and is guided thereby in its up and down movement. Mounted on the block 69 are two angle plate contact members 70 which are connected in the supply circuit for the motor 8. The vertical legs 71 of these members contact with the opposite sides of the block 65. The lower end 72 of the block 65 is tapered so that it can easily be drawn down between the yielding arms 71 as the rear end of the lever 39 drops down.

At the upper part of the block 69 I provide a metal ferrule or band 73 securely mounted on the block and adapted as the receptacle rises to be drawn down between the spring arms 71 and complete the electric motor circuit. The outer faces of the ferrule are flush with the sides of the block 65 so as to offer no hinderance to the free action of the electric switch. The upper contact ends 64 of the spring arms 71 are curved to present rounded surfaces for contact with the block 65 and metal ferrule or contact member 73 for easy operation. The rod 66 is sufficiently yieldable so that it will offer practically no resistance to the up and down movement of the lever 39. The rod 66 is held to the bracket 67 by jam nuts 75 and by this means the height of the block 76 can easily be adjusted. I preferably adjust the height of the block to cause the lower edge of the ferrule 73 to be positioned substantially at the level of the contact points 74 of the spring arms 71 at the instant that the U-shaped member 48 is substantially vertical so that as the receptacle 6 rises rapidly after this point has been reached the block 66 will be drawn down quickly between the arms 71.

The metal ferrule 73 has an appreciable length so that as the receptacle is filling and overbalancing the lever 39 the outer end 41 of the lever can raise to some extent without breaking the circuit, and when the receptacle begins to descend rapidly due to the change of leverage described, the lower edge of the ferrule leaves the contact points of the arms 71 and the circuit is quickly and definitely broken.

I have eliminated all uncertainty in the making and the breaking of the circuit, the same being accomplished definitely and positively and remaining in such position until the time arrives for the alternate change.

The receptacle 6 shown is of peculiar construction in that the cylindrical body 76 with its upper end 77 is made of drawn steel. To mount this shell upon the lower head 5 I provide a relatively heavy clamping ring 78 flanging over the edge 79 of the steel cylinder and I secure the ring 78 to the edge of the head 5 by a plurality of bolts 80. To protect the cylinder and the head 5 against the corroding action of the $CO_2$ I line them with a block tin lining 81.

The water never fills the receptacle to the top, which part is reserved for the introduction of the gas and the water above water in the receptacle. The upper ends of the water supply pipe 29 and the gas supply pipe 31 extend into the space above the maximum water level 55.

For the purpose of causing the water to absorb a maximum percentage of the gas I provide means for causing the water to be divided into a very fine spray or mist as it is delivered into the gas space above the water. For this purpose I close the top of the water pipe 29 and provide a plurality of very small needle like exit holes 82 through which the water is forced in very fine streams. I arrange these fine holes in several vertical rows spaced around the upper end of the water pipe 29 and I provide a baffle 83 in the form of a cross having as many arms 84 as there are rows of the holes 82. The outer ends 85 of the arms are bent downwardly parallel with the water pipe 29 and are arranged one opposite each vertical row of the holes 82 so that as the fine streams of water issue from the holes 82 they will be impinged with great force against the flat faces of the baffles 85 and will be broken up into very fine spray. The water particles are so small or fine that they completely fill the gas space as a cloud and gradually settle down through the gas to the water below, absorbing a maximum quantity of the gas.

As many modification of my invention will readily suggest themselves to one skilled in the art I do not limit or confine my invention to the exact specific constructions herein shown and described, except within the scope of the appended claims.

I claim:

1. In a machine for carbonating liquid, a carbonating receptacle mounted for movement up and down, a counterbalancing lever pivotally mounted between its ends and having one end disposed in relation to the receptacle to be effected by the weight thereof, means arranged between the lever and the receptacle for transmitting the weight of the receptacle to the lever, said transmission means arranged to cause a sudden effective lengthening of the end of the lever associated with the receptacle upon an increase in the total weight thereof above a predetermined amount and a like sudden decrease upon a decrease in weight below a predetermined amount, and means under the control of said lever for starting and stopping the supply of water to said receptacle.

2. In a machine of the kind described, a closed receptacle for liquid mounted on a base for movement up and down, a counterbalancing lever having an end disposed beneath the receptacle to receive weight therefrom, linkage arranged between the receptacle and the associated end of the lever and adapted to suddenly increase the effective length of the said lever and as the receptacle descends below a predetermined point and to suddenly decrease the same as the receptacle rises above a predetermined point, and means associated with said lever for controlling the supply of water to said receptacle.

3. In a machine of the kind described, a receptacle for liquid, means connecting the receptacle with a supply of liquid, a member upon which the receptacle is rigidly mounted, said member pivotally mounted to permit the receptacle to swing up and down, a counterbalancing lever pivotally mounted on pivots rigidly held in relation to the pivotal means mounting the receptacle, and having an end disposed beneath the receptacle, a swinging link hung at one end on the said end of the lever, a strut arranged between the swinging end of the link and the receptacle whereby the effective length of the said end of the lever is suddenly effectively lengthened as the receptacle descends and is likewise suddenly shortened as the receptacle rises, and means controlled by the movement of said lever for controlling the flow of liquid to said receptacle.

4. In a machine of the kind described, a carbonating receptacle, a member upon which the receptacle is mounted, said member pivotally mounted between its ends to swing the receptacle up and down as it empties and fills, a pump connected with the receptacle for forcing liquid into same, a motor for operating the pump, the receptacle, motor and pump being mounted rigid with said member, a motor switch carried by said member, a counterbalanced lever pivotally mounted between its ends and having an end disposed beneath the receptacle to receive weight therefrom, means associated with the lever and receptacle for suddenly lengthening the effective length of the said end of the lever as the receptacle descends and for suddenly shortening same as the receptacle rises, and connection between the switch and said lever for breaking the motor circuit by the sudden movement effected by said sudden change in the length of the lever.

5. In a machine of the kind described, a carbonating receptacle mounted for movement up and down, means for forcing water into the receptacle, a pivotally mounted counterbalancing lever having an end arranged beneath the receptacle, a link depending from said end of the lever and supported thereon at a point higher than the pivotal support of the lever so that as the said end swings down the effective length of the lever is increased, a strut arranged between the lower end of said link and the receptacle for transmitting weight to the link, the lever adapted to cause the link to swing from an inclined relation in the general direction of the lever pivot to a substantially vertical position as the receptacle descends, and said strut being adapted to suddenly swing the lower end of the strut outwardly away from the pivot of the lever and to cause the same to assume a position substantially at right angles to a radial line from the said pivot through the point of support of the link on the lever whereby the said end of the lever is of maximum effective length when the receptacle is at the lower limit of its movement and the receptacle once down to the lower limit of its movement remains in such position until a predetermined amount of liquid is withdrawn from the receptacle, and means controlled by the position of said lever for controlling the supply of water to said receptacle.

6. In a machine of the kind described, a carbonating receptacle mounted for movement up and down, a pivotally mounted counterbalancing lever having an end arranged beneath the receptacle, a link depending from said end of the lever and supported thereon at a point higher than the pivotal support of the lever so that as the said end swings down the effective length of the lever is increased, a strut arranged between the lower end of said link and the receptacle for transmitting weight to the link, the lever adapted to cause the link to swing from an inclined relation in the general direction of the lever pivot to a substantially vertical position as the receptacle descends, and said strut being adapted to swing the lower end of the lever outwardly away from the pivot of the lever and to cause the same to assume a position substantially at right angles to a radial line from the said pivot through the point of support of the link on the lever whereby the said end of the lever is of maximum effective length when the receptacle is at the lower limit of its movement and the receptacle once down to the lowest limit of its movement remains in such position until a predetermined amount of liquid is withdrawn from the receptacle.

7. The improvements herein described comprising a closed carbonating receptacle, power actuated means for forcing liquid into the receptacle, power controlling means associated therewith, the receptacle mounted to move up and down as it empties and fills, a counterbalancing lever having an end arranged beneath the receptacle and pivotally mounted for movement up and down therewith, means interposed between the receptacle and said end of the lever to cause a decrease in the counterbalancing effect of said lever as the receptacle is filling and becomes nearly filled, and a similar increase in the counterbalancing effect as the receptacle is emptying and becomes nearly empty, such changes causing a quick movement of the lever as it approaches each limit of its movement, and means connected with the lever for operating said power controlling means.

8. In a carbonating machine of the kind described, a carbonating receptacle mounted to move up and down between limits as it empties and fills, means for causing it to remain adjacent to its lower limit once it has descended until it has become nearly empty and for causing it to remain adjacent to its upper limit until it is nearly filled, said means comprising a pivotally mounted counterbalancing lever arranged with one end beneath the receptacle, a link hung at its upper end on said end of the lever to swing from and toward the lever pivot, and a strut interposed between the lower end of the link and the receptacle, the lower end of the link being adapted to swing outwardly as the receptacle approaches the lower limit of its movement to suddenly decrease the counterbalancing effect of said lever and to swing inwardly as the receptacle approaches the upper limit of its movement, on account of a decrease of liquid therein, and to likewise increase the counterbalancing effect of the lever.

Signed at Chicago, in the county of Cook and State of Illinois, this 23rd day of July, 1920.

RUDOLPH MUELLER.